UNITED STATES PATENT OFFICE.

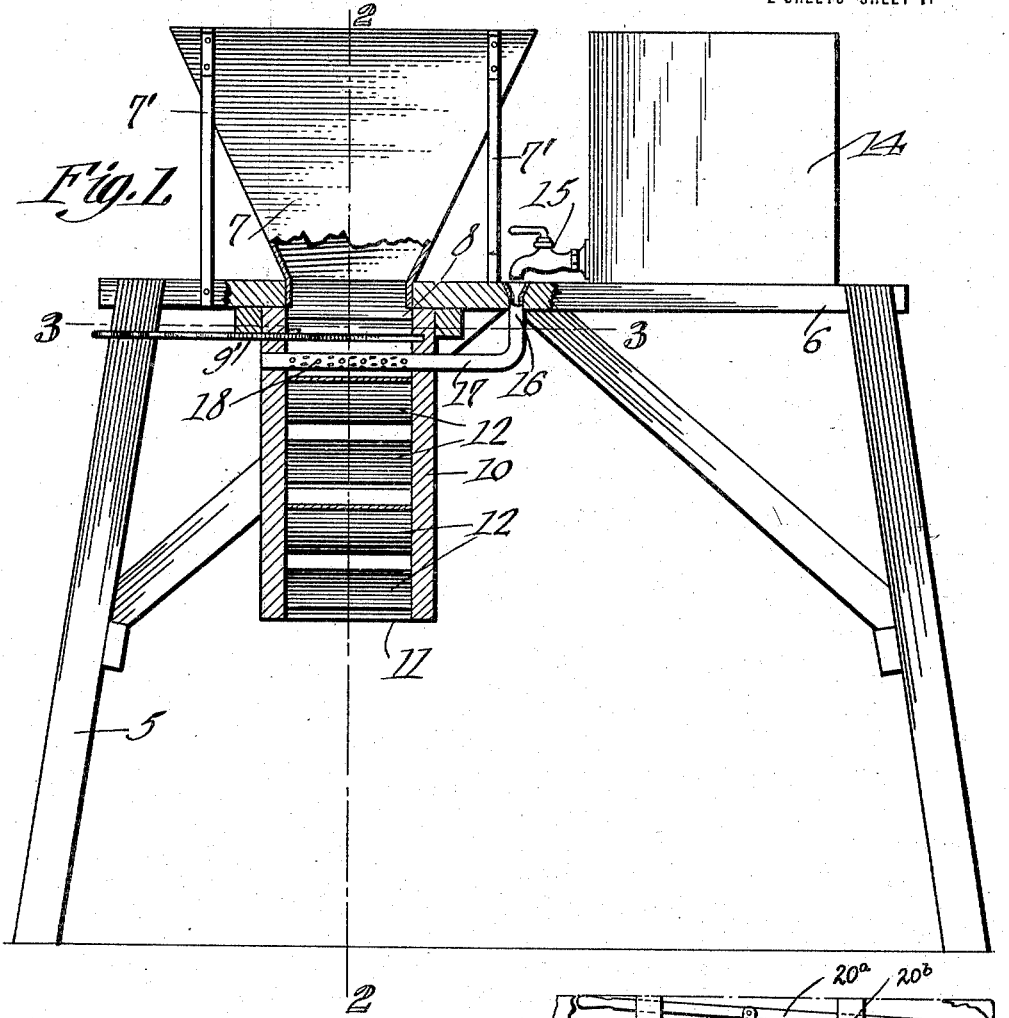
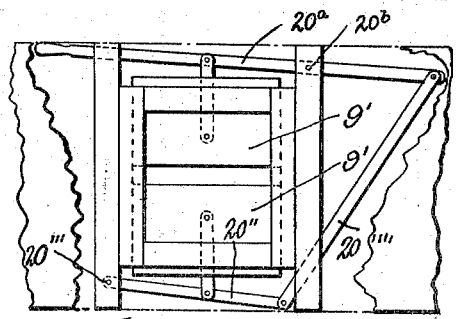

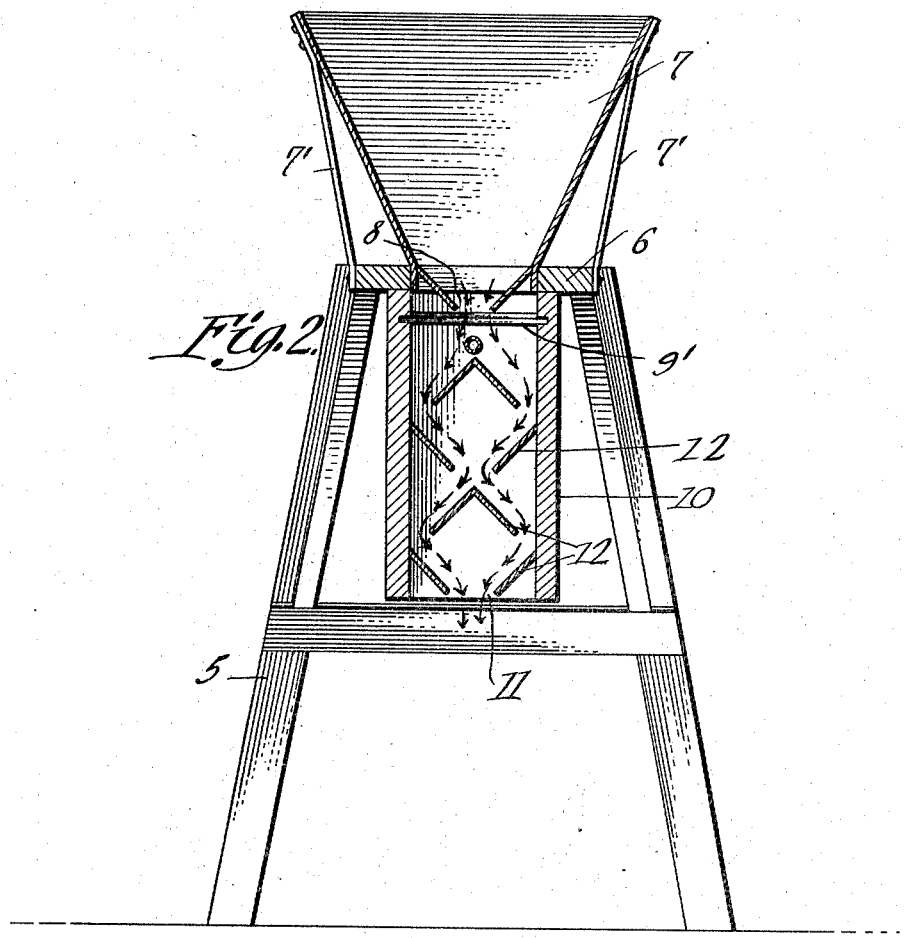
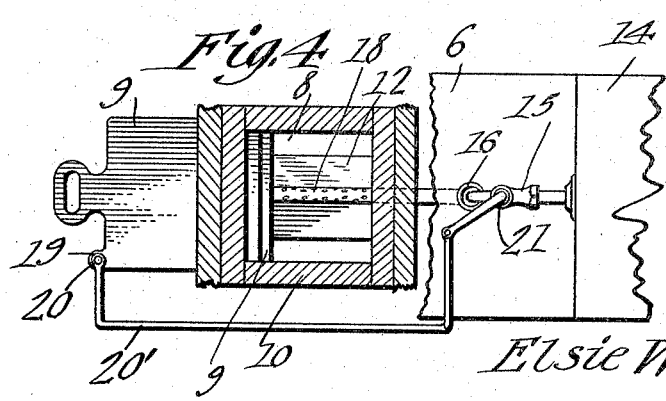

ELSIE WRIGHT, OF CONDON, OREGON.

GRAIN-PICKLING MACHINE.

1,275,819.  Specification of Letters Patent.  Patented Aug. 13, 1918.

Application filed March 6, 1916. Serial No. 82,410.

*To all whom it may concern:*

Be it known that I, ELSIE WRIGHT, a citizen of the United States, residing at Condon, in the county of Gilliam and State of Oregon, have invented certain new and useful Improvements in Grain-Pickling Machines, of which the following is a specification.

The present invention relates to improvements in a grain pickling machine, one object of the invention being the provision of a machine of this character provided with means whereby a pickling solution is thoroughly mixed with the grain in transit, and whereby the flow of grain may be regulated in proportion to the flow of liquid.

With the foregoing and other objects in view, and which will be evident as the description proceeds, the present invention resides in the features hereinafter set forth and particularly claimed.

In the accompanying drawings:

Figure 1 is a side elevation of the frame and solution tank with the mixing chamber and the adjacent portion of the hopper shown in section.

Fig. 2 is a cross section taken on the line 2—2 of Fig. 1.

Fig. 3 is a section taken on the line 3—3 of Fig. 1.

Fig. 4 is an enlarged detail view of a modified form of valve controlling means for both solution and grain.

Referring to the drawings the number 5 designates a supporting structure carrying the top 6 in which is mounted the hopper 7 having braces 7'. The grain outlet 8 is controlled by the slide valves 9' at the upper end of the mixing chamber or compartment 10, which is disposed below the hopper 7.

This chamber is provided with the outlet 11 and has mounted therewithin a plurality of inverted V-shaped transversely disposed baffles 12, which alternate with the side wall carried baffles 13. Thus, the grain discharged from the opening 8, will flow upon the upper baffle 12, and will be divided thereby into two streams following the direction of the arrows as indicated in Fig. 2, until finally discharged through the outlet 11.

The solution for treating the grain is carried in the tank 14, provided with the faucet 15, which empties into the flared end 16, of the L-shaped pipe 17. This flared end is seated in a correspondingly formed opening in the support structure while the opposite portion of the pipe 17, is extended transversely of the mixing chamber above the apex of the upper baffle 12, and is provided with the outlet perforations 13, by means of which the solution is spread upon the grain in transit and thoroughly commingled therewith to thoroughly coat the same before it is drawn through the outlet 11.

As shown in Fig. 3, the two oppositely moving valves 9' are connected to the operating levers $20^a$ and $20''$, the latter being pivoted at $20'''$ to the frame, and having its free end connected to one end of the handle lever $20^a$ by the link $20'''$. The lever $20^a$ is pivoted at $20^b$ to the frame. Thus, when the handle lever $20^a$ is operated, both valves 9' are simultaneously operated.

When it is desirable to control the flow of liquid proportionately to the flow of grain, the construction as illustrated in Fig. 4, is employed. In this instance the stem or handle 19, of the valve 9, has adjustably connected thereto as at 20, a U-shaped rod 20', to which in turn is operably connected the handle of valve 21, of the faucet 15'. Thus, as the handle 19, is manipulated, the faucet valve is opened or closed, its adjustable connection to the handle 19, permitting various ratios to be secured according to the character of the grain treated.

What is claimed as new is:—

In a device of the kind described, in combination, a support, a depending grain-receiving chamber arranged below said support, a liquid-receiving tank mounted upon said table and having a faucet extending outwardly from its lowermost portion, a valve carried by said faucet, a horizontally-slidable gate arranged to move transversely of said chamber so as to bar the inlet of grain thereinto, a crank carried by said faucet valve, a depending link arm secured to the outer end of said crank, and a connecting rod extending alongside of said feed chamber and having its inner end pivotally secured to said link arm and its outer portion extending angularly toward one corner of said gate and being pivotally secured to said corner of the gate, whereby when said gate is opened said connecting rod is shifted to operate said faucet valve.

In testimony whereof I affix my signature.

ELSIE WRIGHT.

Copies of this patent may be obtained for five cents each, by addressing the "Commissioner of Patents, Washington, D. C."